United States Patent [19]
Sharpe

[11] Patent Number: 5,151,648
[45] Date of Patent: Sep. 29, 1992

[54] SCINTILLATION TUBE DYNAMIC CALIBRATION MONITOR AND FEEDBACK REGULATOR

[75] Inventor: David E. Sharpe, Chesterfield, Va.

[73] Assignee: Philip Morris Inc., New York, N.Y.

[21] Appl. No.: 557,123

[22] Filed: Jul. 23, 1990

[51] Int. Cl.⁵ .............................................. G01J 1/44
[52] U.S. Cl. ..................................... 323/282; 363/59; 361/18; 250/374
[58] Field of Search ....................... 250/374, 386, 387; 307/228, 261; 323/273, 274, 276, 282; 363/59, 22, 24; 361/18

[56] References Cited

U.S. PATENT DOCUMENTS

| | | | |
|---|---|---|---|
| 3,795,802 | 3/1974 | Powell | 250/83.3 D |
| 3,809,998 | 5/1974 | Mansson | 323/4 |
| 4,189,017 | 2/1980 | Strobel et al. | 177/212 |
| 4,269,201 | 5/1981 | Powell et al. | 131/280 |
| 4,538,066 | 8/1985 | Carle et al. | 250/374 |
| 5,023,456 | 6/1991 | Claussen | 250/374 |

FOREIGN PATENT DOCUMENTS 3240254 5/1984 Fed. Rep. of Germany .

OTHER PUBLICATIONS

"Op Amp Extends Power-supply Regulation", *EDN Magazine*, Oct. 31, 1984, p. 210.

*Primary Examiner*—Emanuel T. Voeltz
*Attorney, Agent, or Firm*—Charles B. Smith; Alan D. Smith

[57] ABSTRACT

A scintillation tube dynamic calibration monitor that regulates the high voltage power supply to a detector. In a preferred embodiment, a voltage boost current source provides an input voltage for a power out voltage regulator and for a +14.75 volt board regulator. The board regulator provides a voltage reference for various circuitry, and provides a voltage reference for coarse calibration and display calibration adjustment circuitry. The power voltage regulator provides the high voltage power supply drive signal. An error amplifier drives an integrator, which, in turn, drives a bargraph display. An optically-isolated output circuit drives an external alarm or relay. In an alternative embodiment, the pulse width of a detected circuit is linearized and converted to an analog control signal. The analog control signal drives conventional power supply control circuitry.

17 Claims, 4 Drawing Sheets

SCINTILLATION TUBE DYNAMIC CALIBRATION MONITOR AND FEEDBACK REGULATOR

BACKGROUND OF THE INVENTION

This invention relates to a dynamic calibration monitor and feedback regulator for monitoring and regulating the high voltage applied to a scintillation tube radiation detector. More particularly, the present invention relates to a dynamic calibration monitor and feedback regulator utilizing a three terminal floating voltage regulator and an adjustable calibration display to provide visual indication and automatic control of present calibration status relative to the original calibration setpoint.

Scintillation tube radiation detectors are typically powered using an unregulated high voltage power supply. However, the output voltage of an unregulated power supply can change substantially with changes in the load. The tube and the power supply form a coupled system in which physical changes in the tube result, in many cases, in changes in power supply loading with a corresponding change in output voltage. Examples of such physical changes include molecular leaks in the tube envelope, damage by dust or vibration (including noise), and overall aging.

The sensitivity of a scintillation tube radiation detector is directly related to its powering voltage. Therefore, physical changes in the tube and their corresponding loading and voltage changes will directly affect detector sensitivity. In many applications, changes in detector sensitivity must be minimized, so that some form of voltage calibration and monitoring is needed. Further, a limited amount of feedback control is desirable for automatically correcting small variations in powering voltage. Thus, a device is needed to monitor the calibration changes over the life of the tube and to regulate the voltage with changes in loading.

In view of the foregoing, it is an object of this invention to provide a dynamic calibration monitor and feedback regulator having exceptional voltage regulation performance.

It is another object of this invention to provide a dynamic calibration monitor and feedback regulator having an adjustable calibration display for monitoring and adjusting the error voltage using feedback control.

It is a further object of this invention to provide a dynamic calibration monitor and feedback regulator having an adjustable calibration display that is easy to read and understand.

It is a still further object of this invention to provide a dynamic calibration monitor and feedback regulator that is suitable for use in a harsh production environment.

SUMMARY OF THE INVENTION

These and other objects of the invention are accomplished in accordance with the principles of the invention by providing a dynamic calibration monitor and feedback regulator having the following features: (1) a three-terminal floating voltage regulator to provide an adjustable drive signal for an external high voltage power supply, (2) an adjustable voltage reference to provide a calibration setpoint for the floating voltage regulator, (3) a sensitive feedback control circuit to monitor and correct the error between the calibration setpoint and a high voltage feedback signal, (4) a light emitting diode (LED) display to provide dynamic visual indication of calibration error, and (5) an optically isolated output to drive an external alarm or shutdown circuit.

In an alternative embodiment, the output from the high voltage power supply is a function of the detected signal from the detector tubes. The detected signal is converted to an analog signal. The pulse width of the detected signal determines the voltage of the analog signal. The analog signal is input to a power supply control circuit for controlling the high voltage to the detector tubes, closing the loop of the feedback control system.

Using this alternative system, the high voltage supply is a function of the detected signal, and the system operates on a real-time basis. The system is automatically calibrated, and does not require manual adjustment based on a scaled output voltage.

A calibration bargraph monitor may be used to display the drift of a detector tube. Because the high voltage power supply is a function of the detected signal, errors which could be introduced by controlling the power supply with an arbitrary voltage—or by an unregulated voltage supply—are eliminated. Variations displayed on the bargraph reflect only the degradation of the detector tube.

BRIEF DESCRIPTION OF THE DRAWINGS

Further features of the invention, its nature, and various advantages will be more apparent from the accompanying drawings and the following detailed description of the invention, in which like reference numerals refer to like parts throughout, and in which.

DETAILED DESCRIPTION OF THE PREFERRED EMBODIMENTS

Figure 1:
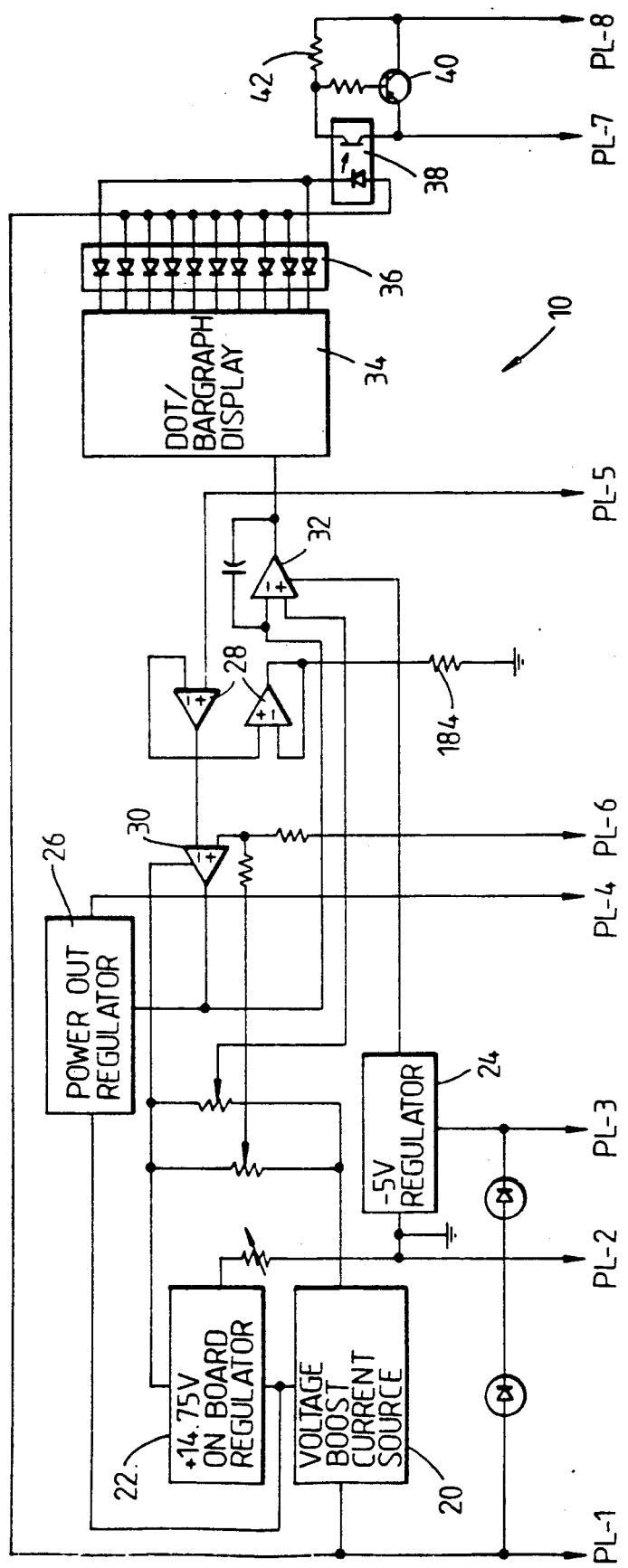
FIG. 1 is a circuit block diagram of a dynamic calibration monitor and feedback regulator device constructed in accordance with the principles of this invention.

An illustrative dynamic calibration monitor and feedback regulator device 10 constructed in accordance with the principles of this invention is shown in FIG. 1. The central elements of device 10 are voltage boost current source 20, +14.75 volt regulator 22, −5 volt regulator 24, power out regulator 26, unity gain buffers 28, error amplifier 30, unity gain integrator 32, display driver 34, light emitting diode (LED) bargraph display 36, optocoupler 38, and power transistor 40.

Considering now the external connections of device 10, starting with PL-1 and going right, PL-1 represents the +12 volt power supply terminal. PL-2 is the power supply common (typically 0 volts), and PL-3 is the −12 volt power supply terminal. The wiring to these three terminals is accomplished through a standard terminal block.

The next pin is the adjustable power out to the high voltage supply (PL-4). This is the signal which drives the high voltage power supply and typically ranges from +10.7 volts to +11.5 volts.

The next pin is to provide a future means for varying the calibration while device 10 is operating (PL-6). This pin is currently not used.

The next pin is the high voltage feedback signal (PL-5). This is a scaled version of the output voltage of the external high voltage power supply which drives the scintillation tube. The high voltage feedback signal is monitored dynamically and used to adjust the power out at PL-4.

The next two pins are the switched output (PL-7, PL-8) for driving an external relay or other alarm. The switch is a transistor that is turned on when the present output voltage deviates from the original calibration setpoint by a certain amount (typically ±2%).

Considering now the central elements of device 10, voltage boost current source 20 is used to provide input voltage for power out regulator 26. Source 20 also provides input voltage for +14.75 volt on board regulator 22. Regulator 22 provides a regulated +14.75 volt (±0.03 volts) reference for the operational amplifiers comprising error amp 30, unity gain buffers 28, and integrator 32. Further, regulator 22 provides a reference for the coarse calibration adjustment circuitry and the display calibration adjustment circuitry.

−5 volt regulator 24 provides a local reference for the operational amplifiers mentioned above. Power out regulator 26 provides the output signal to drive the external high voltage power supply. The high voltage feedback signal is buffered by unity gain buffers 28, then routed to error amp 30 and to test load resistor 184.

Error amp 30 drives the voltage adjust pin of power out regulator 26, thus adjusting the output signal depending on the magnitude and polarity of the error. Error amp 30 also drives unity gain integrator 32, which smooths and scales the output of error amp 30 thus reducing the susceptibility of the display to random noise. LED display 36 provides a visual display of the present calibration status relative to the original calibration setpoint.

Optocoupler 38 provides electrical isolation for device 10 so that noise susceptibility is reduced. Power transistor 40 drives an external relay or alarm.

Figure 2:
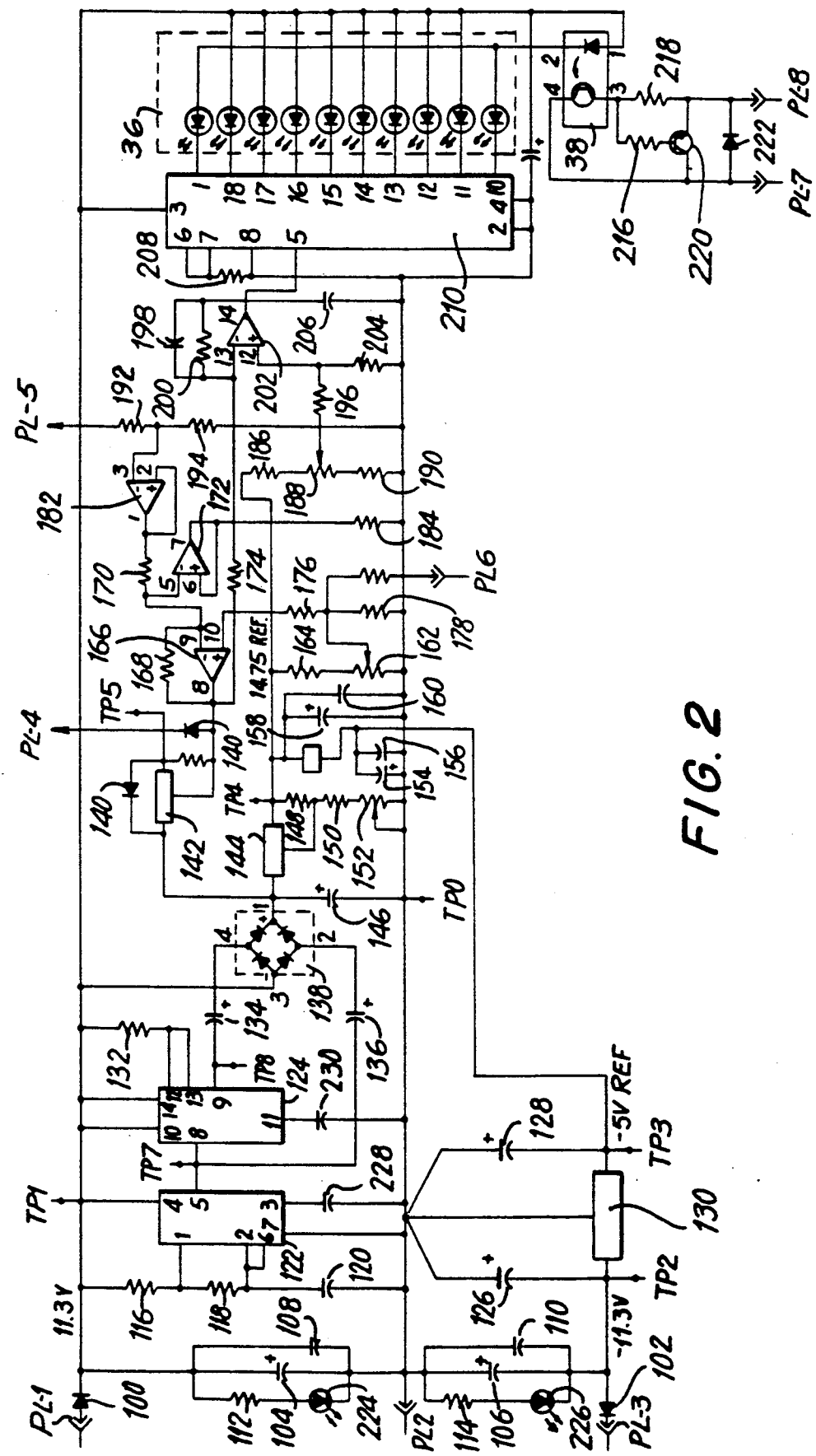
FIG. 2 is a detailed circuit diagram of the dynamic calibration monitor of FIG. 1.

As mentioned above, FIG. 2 is a more detailed circuit diagram of device 10. Considering components of the circuit diagram from left to right, diodes 100 and 102 along with capacitors 104, 106, 108, and 110 provide input polarity and noise protection. If the wiring to the device (pins P1, P2, and P3) is correct, diodes 100 and 102 will be forward biased and LED's 224 and 226 will be illuminated. Further, capacitors 104, 106, 108, and 110 will charge to about ±11.3 volts and will serve to filter any high frequency noise present in the input power.

If the wiring to the device is incorrect, diodes 100 and 102 will be reverse-biased and LED's 224 and 226 will not be illuminated. In this condition, the input power will be prevented from reaching the rest of device 10.

Voltage boost current source 20 is based upon a push-pull charge pump designed around integrated circuits (IC's) 122 and 124. IC 122 is a standard bipolar (not CMOS) digital timer (such as SE556N available from Texas Instruments, Dallas, Tex.) configured as a 50 percent duty cycle, a stable oscillator with an oscillation frequency of about 18 kilohertz. This particular frequency is determined by the values of resistors 116 and 118, and capacitor 120 which form a resistor-capacitor (RC) network that controls the cycle time of IC 122. The output of IC 122 is a square wave signal whose pulse width is determined by the ratio of the values of resistors 116 and 118. In the preferred embodiment, resistor 116 has a value of 1,000 ohms and resistor 118 has a value of 10,000 ohms.

The output square wave of IC 122 is connected to the input of IC 124, the latter another digital timer (again, a SE556N), configured here as an inverting power buffer. IC 124 inverts the square wave input provided by IC 122, with a pulse width determined by IC 122.

The outputs of IC's 122 and 124 are connected through capacitors 134 and 136 to full-wave rectifier 138. This combination, along with capacitor 146, forms the above mentioned push-pull charge pump which functions as a full-wave voltage doubling circuit. When the output of IC 122 is low (typically 0 volts), the positive side of capacitor 136 is charged from the +11.3 volt bus through bridge rectifier 138 (such as VM108, commercially available from Varo Corporation), while the negative side of capacitor 136 is held low. Concurrently, the output of IC 124 is high (typically 11.3 volts).

When the output of IC 122 goes high, the output voltage of IC 122 is added to the voltage stored on the positive side of capacitor 136. This boosted voltage charges the positive side of capacitor 146 through rectifier 138. Concurrent)y, the output of IC 124 is low.

The above process is repeated each time the outputs of IC's 122 and 124 are cycled, resulting in a relatively constant direct current (DC) voltage being maintained on capacitor 146. Typical values for this DC voltage are 21 volts (no load) and 17 volts (full load). The output ripple from this circuit is about 100 millivolts and the power conversion efficiency is about 70%.

−5 volt regulator 24 is based upon a standard voltage regulator (such as LM7905, commercially available from National Semiconductor) IC 130. The input to IC 130 is connected to the −12 volt power input and is referenced to ground. Capacitors 126 and 128 provide filtering for IC 130, and the output of IC 130 provides a local −5 volt reference for powering operational amplifiers 166, 172, 182, and 202.

+14.75 volt regulator 22 is also based upon a standard voltage regulator (such as LM317T, also available from National Semiconductor) IC 144. The input to IC 144 is connected to the output of rectifier 138 and the positive side of capacitor 146. The voltage adjust pin of IC 144 is connected to the reference adjustment circuitry, consisting of resistors 148 and 150, and variable resistor 152. Variable resistor 152 is used to adjust the output of IC 144 to +14.75 volts (i0.03 volt). The output of IC 144 provides a local +14.75 volt reference to operational amplifiers 166, 172, 182, and 202 (Typically, a TL084BC Quad OP-AMP, commercially available from Texas Instruments). IC 144 further provides a reference for powering the coarse calibration adjustment circuitry, consisting of resistors 164, 176, and 178, and variable resistor 162, and the display calibration adjustment circuitry consisting of resistors 186, 190, 196, and 204, and variable resistor 188. Coarse calibration adjustment circuitry is used to set the calibration reference of operational amplifier 166, while display calibration adjustment circuitry scales the output of operational amplifier 202 to the range of dot/bargraph display driver 210.

Power out regulator 26 is also based upon a standard voltage regulator (another LM317T) IC 142. The input to IC 142 is connected to the output of rectifier 138 and the positive side of capacitor 146. Diodes 140 provide reverse-bias protection. The voltage adjust pin of IC 142 is connected to the output of operational amplifier 166. The output of IC 142 provides the power input to the external high voltage power supply (typically 10.7 to 11.5 volts) via pin P4.

The feedback signal is connected from the external high voltage power supply to pin P5 via a shielded cable. The feedback signal is passed through a 2 to 1 divider consisting of resistors 192 and 194, and is connected to the non-inverting input of operational amplifier 182 which forms a first noninverting unity gain buffer 28. The output of amplifier 182 is connected to current limiting resistor 170, and is then connected to operational amplifier 172 (TL084BC) which forms a second non-inverting unity gain buffer 28. The output of amplifier 172 is connected to resistor 184. The voltage across resistor 184 is about 1/400 of the high voltage output being supplied to the scintillation tube. The output of resistor 170 is further connected to the inverting input of operational amplifier 166 which, in conjunction with resistor 168, forms error amp 30 which has a loop gain of about 100. The non-inverting input of amplifier 166 is connected to the coarse calibration adjustment circuitry. The output (error voltage) of operational amplifier 166 is connected to the voltage adjust pin of IC 142. The error voltage (VERR) is the difference of the coarse calibration voltage (VREF) and the high voltage feedback signal (VHVF). If VHVF decreases (becomes more negative), then VERR increases and IC 142 increases the voltage to the high voltage power supply. If VHVF increases (becomes more positive), then VERR decreases and IC 142 decreases the voltage to the high voltage power supply.

The output of amplifier 166 is also connected through resistor 174 to the inverting input of operational amplifier 202 (TL084BC) which, in conjunction with capacitor 198 and resistor 200, forms unity gain integrator 32 which has a fixed time constant of 100 milliseconds. The non-inverting input of amplifier 202 is connected to the display calibration adjustment circuitry. The integrated output signal of amplifier 202 is connected to the input of display driver 210 (an LM3914N, commercially available from National Semiconductor), and reduces the susceptibility of the display to random noise.

Display driver 210 is programmed in the "dot" mode, and resistor 208 sets the output current to the LED's. Tying pins 6 and 7 of display driver 210 together sets the sensitivity at 0.125 volts per LED. The display is calibrated by adjusting variable resistor 188 until the middle two LED's are illuminated with equal brightness. As VERR changes, the LED's change to indicate the dynamic loading of the high voltage power supply. A one-LED full brightness change corresponds to a load change of about 0.4%.

Optocoupler 214 (such as TIL111, also available from Texas Instruments) is used to isolate the rest of the circuit from its noisy environment, and to turn on power transistor 220 (Model TIP42B, also available from Texas Instruments). Transistor 220 can drive an external alarm or other inductive load, with diode 222 used for arc suppression.

In an alternative embodiment of the invention, an automatic calibrator (shown in FIGS. 3 and 4) is used to calibrate the scintillation detector. The high voltage to the detector tubes is a function of the actual detected radiation signal. The detected signal is used to generate the feedback voltage, enabling automatic correction of detector tube drift and aging. Also, such an "automatic calibrator" typically may provide an immediate alarm condition to an abrupt detector circuit or scintillation tube failure.

Figure 3:
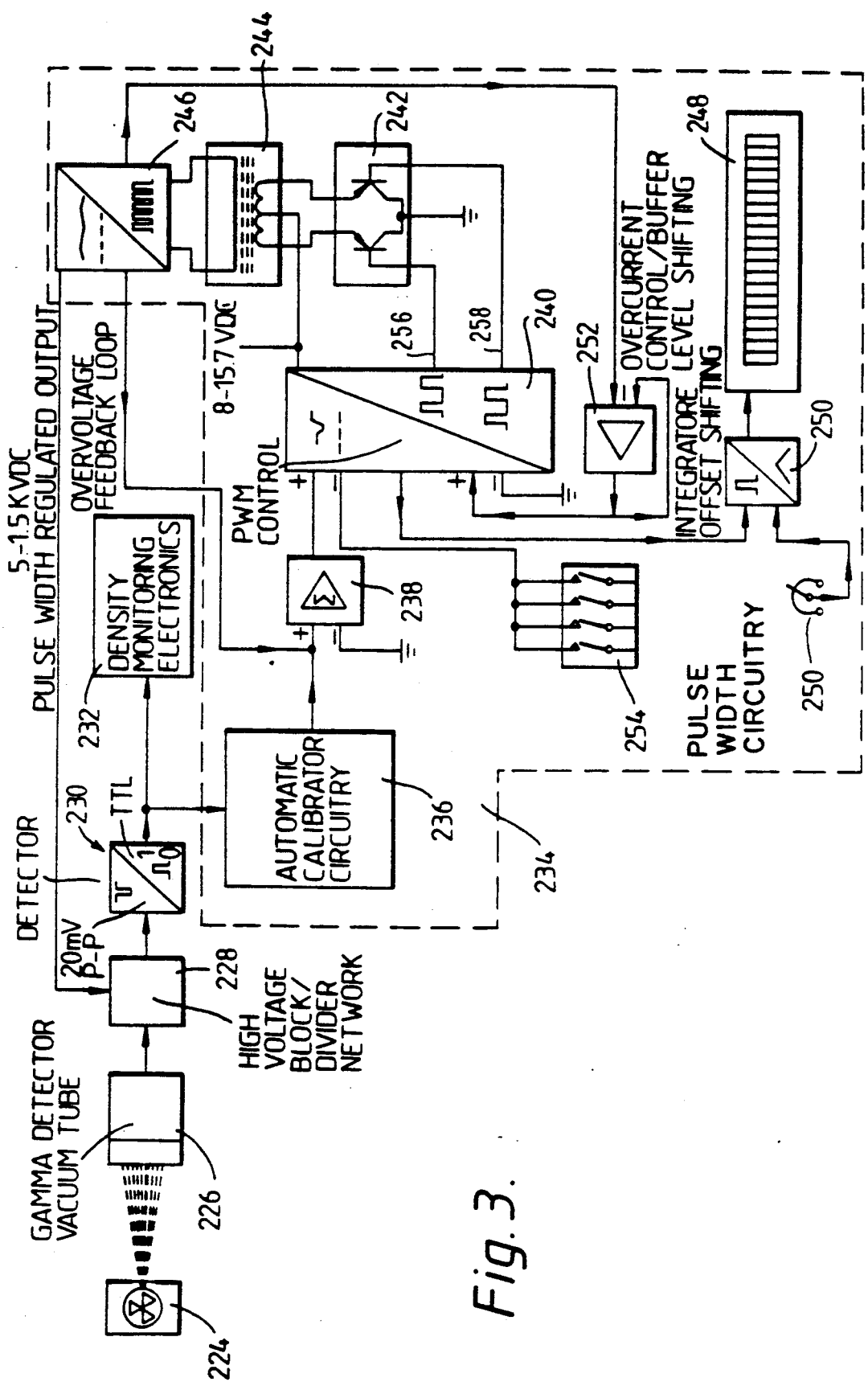
FIG. 3 is a circuit block diagram of an alternative embodiment of a feedback calibration circuit constructed in accordance with the principles of this invention.

Referring to FIG. 3, radiation from a source 224 strikes a vacuum tube 226. An output signal from tube 226 is transmitted to a high voltage divider network 228 and then to a detector circuit 230. The output of detector 230 is coupled to the density monitoring electronics and to the calibration feedback loop 234. The output of calibration feedback loop 234 is fed back to high voltage network 228, thereby making the high voltage to the detector tubes a function of the actual detected radiation signal. The feedback signal from feedback loop 234 is the output from the high voltage power supply 246. In this embodiment, the power supply output voltage is a function of the pulse width of the detected radiation signal. The pulse width of the detected signal directly corresponds to the voltage detected. The pulse width regulated output of this embodiment would replace the scaled high voltage signal of the embodiment of the invention shown in FIGS. 1 and 2 for closing the loop on the calibration monitor.

Calibration feedback loop 234 includes automatic calibrator circuitry 236 (shown in detail in FIG. 4), a summing amplifier 238 (one for each channel), pulse width modulated power supply control circuitry 240, output drive transistors 242, a high voltage pulse transformer 244, and a high voltage power supply 246. Feedback loop 234 typically may include display apparatus, such as calibration bargraph monitor 248 (e.g., an LED display) and offset adjustment circuitry 250 (e.g., an integrator with offset shifting and a variable resistor). Feedback loop 234 may also include overcurrent control circuitry 252 to limit the current output from power supply 246, and an array of switches and resistors 254 to provide a user-programmable pulse width.

Detected signals enter calibration feedback loop 234 through automatic calibrator circuitry 236. The pulse train is random, and has a nominal frequency of about 150 KHz. The output of circuitry 236 is summed with an overvoltage feedback signal from power supply 246 in summing amplifier 238, and then input to power supply control circuitry 240. Power supply control circuitry 240 is a commercially available integrated circuit (such as Model TL494, available from Texas Instruments, Inc.). Other inputs to control circuitry 240 include the output from overcurrent control circuitry 252 and user-programmable pulse width circuitry 254. Control circuitry 240 outputs control pulses (control pulses for two separate channels are shown, designated by reference numerals 256 and 258) to drive transistors 242 (which typically are included on the same integrated circuit as control circuitry 240). Transistors 242 control the voltage on the primary winding of pulse transformer 244, which, in turn, controls the voltage on the transformer secondary winding and the output of power supply 246. The pulse width regulated output of power supply 246 is returned to the high voltage divider network 228 to power the detector tube.

Figure 4:
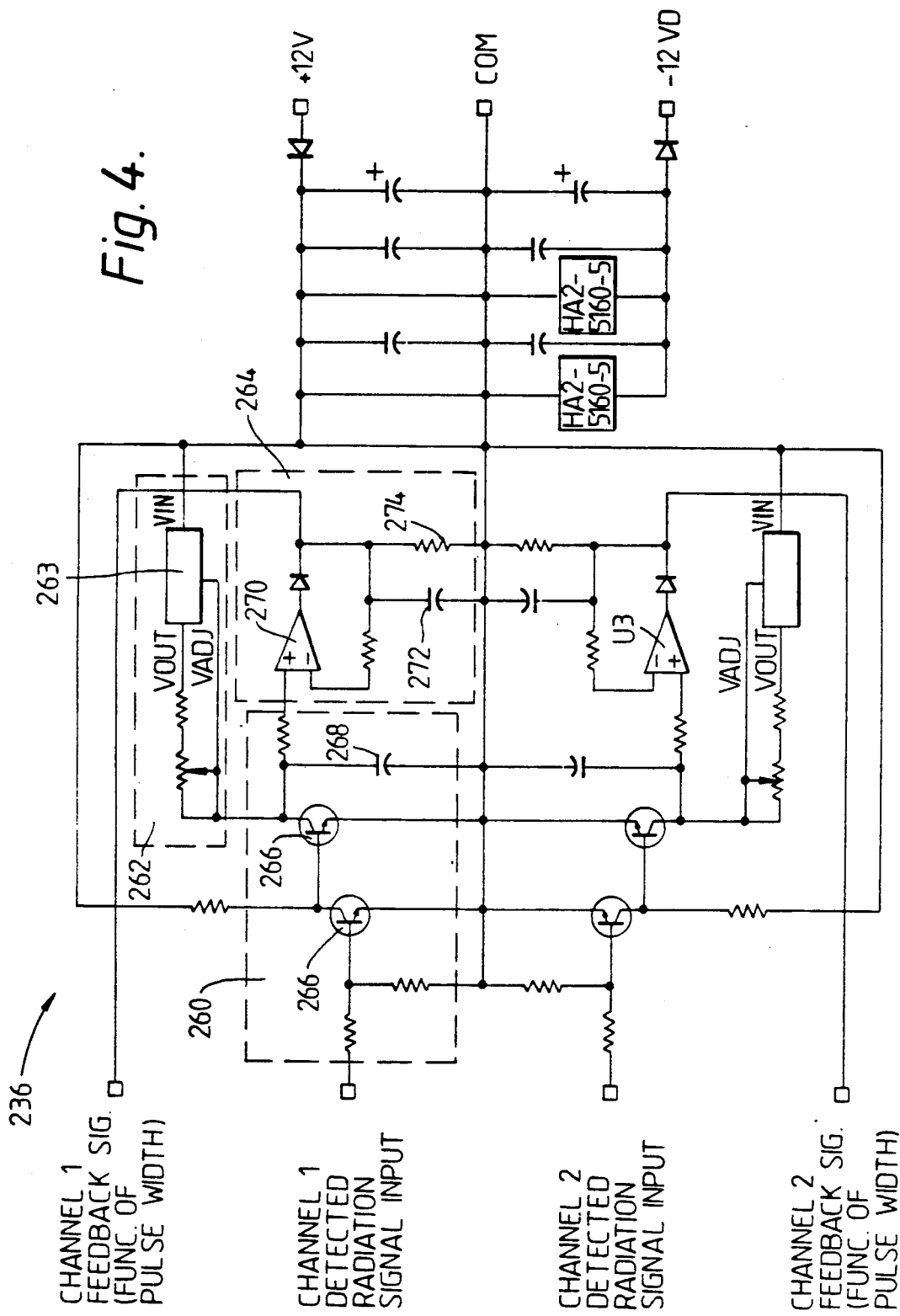
FIG. 4 is a detailed circuit diagram of the automatic calibration circuitry of FIG. 3.

Referring to FIG. 4, a two channel automatic calibrator circuit is shown. The circuitry for each channel is independent from the other. Each channel corresponds to a different tube. Because the two channels operate in an identical manner, the circuit will be described with reference to a single channel.

The detected radiation signal (from detector 230) is input to a high speed integrator (with reset) 260. Powered by a constant current source 262, integrator 260 converts the input signal to a triagular output signal.

The output of the integrator is input to a peak detector 264, which converts the triangular wave to an analog signal to be input to pulse width modulated power supply control circuitry 240 (via summing amplifier 238). The resistor and capacitor values of the components of FIG. 4 are frequency dependent, and therefore must be tailored to the detector circutry being used.

Integrator 260 typically may include a pair of npn transistors 266 which buffer the detected signal. The transistors charge a capacitor 268. Current source 262 causes the capacitor to charge linearly, forming a saw-tooth wave which peaks at the end of the detected radiation signal pulse.

Current source 262 includes a commercially available voltage regulator 263. The output of regulator 263 is coupled to capacitor 268 and to the voltage adjust terminal of the regulator through a predetermined resistance. A variable resistor may be used to determine the optimal output of regulator 263. Alternatively, a single fixed resistor may be used.

Peak detector circuit 264 typically includes an operational amplifier 270. A capacitor 272 maintains a relatively constant voltage on the negative input terminal of amplifier 270, and also maintains the voltage at the amplifier's output. The feedback signal out of circuit 236 is an analog signal with a relatively constant voltage, even though the voltage on the positive input terminal of amplifier 270 appears as a saw-tooth wave. A resistor with a high resistance value is placed in parallel with capacitor 272 to slowly discharge the capacitor, permitting the capacitor voltage to drop gradually.

The operation of feedback loop 234 will now be described. In each case, peak detector 264 converts the pulse width of a detected radiation pulse into an analog control signal, to be input to power supply control circuitry 240 for controlling the voltage supplied to the detector tubes.

If the pulse width of the detected radiation pulse increases, capacitor 268 charges to a higher voltage, and the saw-tooth wave output from integrator 260 reaches a higher peak voltage. The higher peak voltage charges capacitor 272 to a higher voltage, causing the analog input signal to summing amplifier 238 and control circuitry 240 to be at a higher voltage. Voltage control circuitry 240 responds by pulsing high voltage power supply 246 so as to decrease the voltage to high voltage network 228.

If the pulse width of the detected radiation pulse decreases, capacitor 268 charges less, and the triangle wave output from integrator 260 reaches a lower peak voltage. Capacitor 272, which discharges slowly through resistor 274, charges to a lower voltage. The lower voltage on capacitor 272 and the lower voltage on the positive input terminal of operational amplifier 270 causes the analog input signal to summing amplifier 238 and control circuitry 240 to be at a lower voltage. Voltage control circuitry 240 responds by pulsing high voltage power supply 246 so as to increase the voltage to high voltage network 228.

It will be understood that the foregoing, is merely illustrative of the principles of the invention, and that various modifications can be made by those skilled in the art without departing from the scope and spirit of the invention.

What is claimed is:

1. A scintillation tube dynamic calibration monitor and regulator device comprising:

power out voltage regulator means including output means for providing a drive signal for an external high voltage power supply;

feedback means for dynamically adjusting said power out voltage regulator means, including first input means for receiving a high voltage feedback signal, and coarse calibration adjustment means for setting a calibration reference voltage, said feedback means being electrically connected to said power out voltage regulator means; and display means electrically connected to said feedback means for visually displaying present calibration status relative to said calibration reference voltage.

2. The device of claim 1, wherein said display means comprises display calibration adjustment means for scaling the output of said feedback means.

3. The device of claim 1, further comprising switch means for actuating an external circuit.

4. The device of claim 1, further comprising:

first voltage regulator means for providing a first regulated voltage reference to said feedback means, said first voltage regulator means being electrically connected to said feedback means;

voltage boost current source means for providing voltage to said power out voltage regulator means and to said first voltage regulator means including second input means for receiving power from an external power source, said voltage boost current source being electrically connected to said power out voltage regulator means and to said first voltage regulator means; and second voltage regulator means for providing a second regulated voltage to said feedback means, said second voltage regulator means being electrically connected between said feedback means and said second input means.

5. The device of claim 4, wherein said second input means comprises:

input polarity and noise protection means for assuring that said external power source is correctly connected to said voltage boost current source means and to said second voltage regulator means.

6. The device of claim 4, wherein said first voltage regulator means is a +14.75 volt board voltage regulator.

7. The device of claim 4, wherein said second voltage regulator means is a −5 volt voltage regulator.

8. The device of claim 4, wherein said voltage boost current source means comprises:

a push-pull charge pump means for doubling voltage from said second input means, including means for rectifying said doubled voltage.

9. The device of claim 1, wherein said feedback means comprises:

first unity gain buffer means for buffering said high voltage feedback signal, said first unity gain buffer means being electrically connected to said second input means;

second unity gain buffer means for further buffering of first unity gain buffer means output signal, said second unity gain buffer means being electrically connected to said first unity gain buffer means;

error amp means for providing a voltage difference signal between said buffered high voltage feedback signal and said calibration reference voltage, said error amp means being electrically connected between said first unity gain buffer means and said power out regulator means; and test load means for providing external measurement means of second unity gain buffer means output, said test load means being electrically connected to said second unity gain buffer means.

10. The device of claim 1, wherein said display means further comprises:
   unity gain integrator means for smoothing said voltage difference signal, said unity gain integrator means being electrically connected to said error amp means; and
   bargraph display means for visually displaying said smoothed difference signal, said bargraph display means being electrically connected to said unity gain integrator means.

11. The device of claim 3, wherein said switch means comprises:
   means for optically isolating said device from external noise, said optical isolation means being electrically connected to said display means;
   solid state switch means for actuating an external circuit; and
   second output means for connecting said solid state switch means to said external circuit, said second output means being electrically connected to said solid state switch means.

12. A scintillation tube regulator device for regulating the voltage output from a power supply to a scintillation tube, comprising:
   means for converting the pulse width of a detected signal pulse into a linear signal, said linear signal having a minimum voltage corresponding to a leading edge of the detected pulse and a peak voltage corresponding to a trailing edge of the detected pulse;
   means for detecting the peak voltage of said linear signal;
   means for converting the detected peak voltage to an analog signal; and
   means responsive to said analog signal for controlling the voltage output from said power supply.

13. The device of claim 12, further comprising display means for displaying variations in the detected signal pulse.

14. The device of claim 12, further comprising means for detecting overcurrent conditions in said power supply.

15. The device of claim 12, further comprising means for summing said analog signal with an overvoltage signal from said power supply such that said means for controlling the voltage output from said power supply is responsive to the sum of said analog signal and said overvoltage signal.

16. The apparatus of claim 12, wherein said means for converting the pulse width of a detected signal pulse into a linear signal comprises:
   a constant current source; and
   an integrator circuit for linearly charging a capacitor with current from said constant current source in response to said detected signal pulse.

17. The apparatus of claim 12, wherein said means for converting the detected peak voltage to an analog signal comprises:
   a capacitor coupled to said means for detecting the peak voltage; and
   a resistor, connected in parallel with said capacitor, for slowly discharging said capacitor.

* * * * *